UNITED STATES PATENT OFFICE.

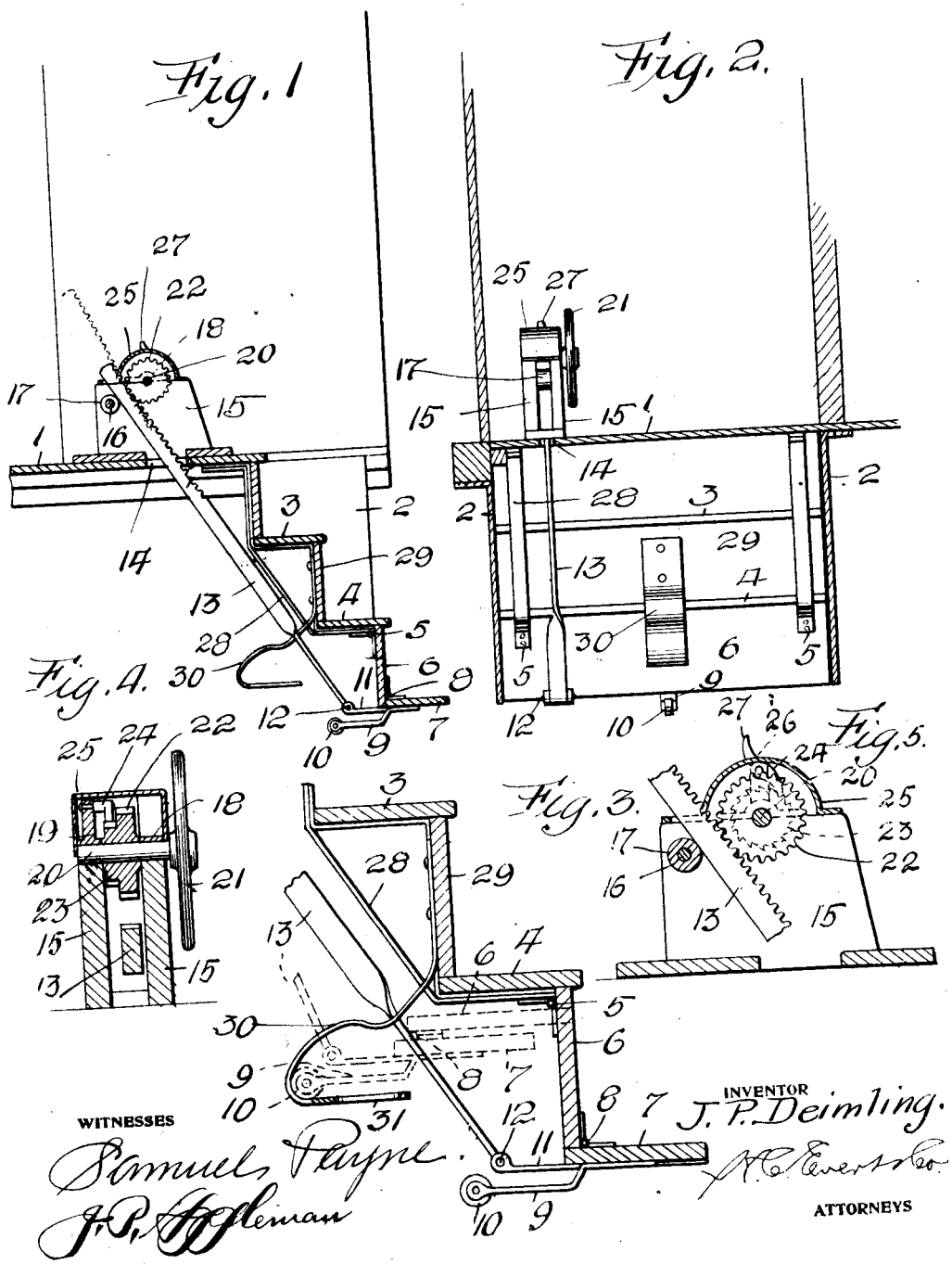

JOHN PHILLIPP DEIMLING, OF CLARION, PENNSYLVANIA, ASSIGNOR OF ONE-THIRD TO WALTER GRAHAM, OF CLARION, PENNSYLVANIA.

FOLDING STEP.

1,048,502.

Specification of Letters Patent. Patented Dec. 31, 1912.

Application filed May 21, 1912. Serial No. 698,756.

*To all whom it may concern:*

Be it known that I, JOHN PHILLIPP DEIMLING, a citizen of the United States of America, residing at Clarion, in the county of Clarion and State of Pennsylvania, have invented certain new and useful Improvements in Folding Steps, of which the following is a specification, reference being had therein to the accompanying drawing.

This invention relates to folding steps, and the primary object of my invention is the provision of positive and reliable means, as hereinafter set forth, for folding the tread and riser at the foot of a flight of steps, whereby the steps cannot be ascended.

Another object of this invention is to provide a folding step that can be advantageously used in connection with rail-way passenger coaches, street-cars, and vehicles that are entered through the medium of steps, whereby the coach, car or vehicle cannot be entered when the same is in motion, thereby removing all liability of a person being injured by attempting to board a vehicle when the same is in motion.

A further object of this invention is to accomplish the above result by a mechanical construction that is durable, inexpensive to install, easy to operate and highly efficient for the purposes for which it is intended.

With the above and other objects in view, the invention resides in a novel construction, combination and arrangement of parts to be hereinafter specifically described and then claimed.

Reference will now be had to the drawing, wherein like numerals denote corresponding parts throughout the several views, in which—

Figure 1 is a longitudinal sectional view of a flight of steps provided with a foldable step in accordance with this invention. Fig. 2 is a rear elevation of the same. Fig. 3 is an enlarged longitudinal sectional view of the step, illustrating the foldable step in a closed position by dotted lines. Fig. 4 is an enlarged cross sectional view of the step operating mechanism, and Fig. 5 is a longitudinal sectional view of the same.

The reference numeral 1 denotes a platform having depending side walls 2 connected by stationary steps 3 and 4.

Hinged to the underside of the step 4, as at 5 is a riser 6 of a foldable step that has a tread 7 hinged to the riser 6, as at 8. The underside of the tread 7 is provided with a rearwardly projecting arm 9 supporting a revoluble roller 10. The tread 7 also has a rearwardly projecting bearing 11 and pivotally connected to said bearing, as at 12 is the lower twisted end of a rack-bar 13. The rack-bar 13 extends upwardly through an opening 14 provided therefor in the platform 1, said rack-bar extending between two standards 15 arranged in parallelism upon the platform 1. The standards 15 are connected by a transverse pin 16 and revolubly mounted upon said pin is a roller 17 upon which the upper end of the rack-bar 13 rests. The upper ends of the standards 15 are provided with bearings 18 and 19 for a revoluble shaft 20 that has one end thereof provided with a large hand wheel 21. Mounted upon the shaft 20 is a combined pinion 22 and a ratchet wheel 23. The pinion 22 meshes with the rack-bar 13 and engaging the ratchet wheel 23 is a pivoted gravity pawl 24, carried by the bearing 19. The upper ends of the standards 15 support a hood or casing 25 that is provided with an opening 26 whereby the handle or end 27 of the gravity pawl 24 can extend through said hood or casing and permit of the operator of the foldable step releasing the ratchet wheel 23 so that the shaft 20 can freely revolve.

The stationary steps 3 and 4 are braced by straps 28 and the riser 29 of the step 4 has a rear side thereof provided with a curved guide 30 that has the lower end thereof in a horizontal plane and slotted, as at 31.

When the shaft 20 is revolved to elevate the rack 13, said rack pulls upwardly upon the lower edge of the riser 6 of the foldable step. As the riser 6 is closed the roller 10 of the rearwardly extending arm 9 passes through the slot 31 of the curved guide 30, until the roller 10 impinges said guides. The roller is then guided downwardly to the position shown in dotted line in Fig. 3, such position causing the tread 7 to fold against the riser 6. The folded step is retained in a closed position by the gravity pawl 24 engaging the ratchet wheel 23. It is then impossible for a person to mount on stationary steps 3 and 4. Upon the vehicle reaching a station or crossing, the operator of the vehicle can shift the pawl 24 to relieve the shaft 20, thereby allowing the step to open by gravity.

It is thought that the operation and utility of the foldable step will be apparent without further description, and while in the drawing there is illustrated a preferred embodiment of my invention, it is to be understood that the structural elements are susceptible to such variations and modifications as fall within the scope of the appended claims.

What I claim is:—

1. A combination with a platform, and stationary steps, of a foldable step at the lower end of said stationary steps, a rearwardly projecting arm carried by the tread of said foldable steps, a rack-bar connected to the lower edge of the riser of said foldable step and extending upwardly to said platform, means carried by said platform and engaging said rack-bar for folding the riser of said foldable step, and means carried by said stationary steps and adapted to be engaged by the arm of said foldable step for folding the tread of said step against the riser thereof.

2. The combination with a platform, and stationary steps, of a foldable step arranged at the foot of said stationary steps, a rack-bar connected to the lower edge of the riser of said foldable step and extending upwardly to said platform, a revoluble roller supported by the tread of said foldable step, a guide carried by said stationary steps and engaged by said roller for folding the tread of said foldable step against the riser thereof, and means located upon said platform and engaging said rack-bar for moving said bar and folding the riser of said foldable step.

3. The combination with a platform, and stationary steps carried thereby, of a foldable step connected to said stationary steps, a rack-bar having the lower end thereof connected to the riser of said foldable step and extending upwardly through an opening provided therefor in said platform, a revoluble pinion engaging said rack-bar for shifting said bar and folding the riser of said foldable step, a revoluble roller supported by the tread of said foldable step, a guide carried by said stationary steps and adapted to be engaged by said roller to fold the tread of said foldable step against the riser thereof as said riser is folded, and means associated with said pinion for locking said pinion against rotation whereby said foldable step can be retained in a folded position.

In testimony whereof I affix my signature in the presence of two witnesses.

JOHN PHILLIPP DEIMLING.

Witnesses:
 MAX H. SROLOVITZ,
 K. H. BUTLER.